US009156688B2

(12) United States Patent
Hyde et al.

(10) Patent No.: US 9,156,688 B2
(45) Date of Patent: Oct. 13, 2015

(54) SYSTEMS AND METHODS FOR PRODUCING HYDROGEN GAS

(71) Applicant: Elwha LLC, Bellevue, WA (US)

(72) Inventors: Roderick A. Hyde, Redmond, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 13/691,543

(22) Filed: Nov. 30, 2012

(65) Prior Publication Data

US 2014/0154169 A1 Jun. 5, 2014

(51) Int. Cl.
*C01B 3/24* (2006.01)

(52) U.S. Cl.
CPC ........................... *C01B 3/24* (2013.01)

(58) Field of Classification Search
None
See application file for complete search history.

(56) References Cited

U.S. PATENT DOCUMENTS

| | | | |
|---|---|---|---|
| 1,717,354 A * | 6/1929 | Burwell | 423/450 |
| 2,062,358 A | 12/1936 | Frolich | |
| 2,769,772 A | 11/1956 | Gomory | |
| 2,791,990 A | 5/1957 | Grieb | |
| 2,926,073 A | 2/1960 | Robinson et al. | |
| 3,819,740 A | 6/1974 | Hori | |
| 3,929,431 A | 12/1975 | Koh et al. | |
| 4,056,602 A | 11/1977 | Matovich | |
| 4,341,598 A | 7/1982 | Green | |
| 4,836,898 A | 6/1989 | Noyes | |
| 5,213,770 A | 5/1993 | Noyes | |
| 5,409,784 A | 4/1995 | Bromberg et al. | |
| 5,650,132 A | 7/1997 | Murata et al. | |
| 5,749,937 A | 5/1998 | Detering et al. | |
| 5,922,192 A | 7/1999 | Zimmermann et al. | |

(Continued)

FOREIGN PATENT DOCUMENTS

| | | | | |
|---|---|---|---|---|
| EP | 0205598 B1 | 1/1992 | | |
| WO | WO 00/21878 | * 4/2000 | ............... | C01B 3/26 |
| WO | WO 2008/155538 A2 | 12/2008 | | |

OTHER PUBLICATIONS

Popov et al., "Natural gas pyrolysis in the regenerative gas heater Part I: Natural gas thermal decomposition at a hot matrix in a regenerative gas heater", International Journal of Hydrogen Energy 24 (1999), pp. 327-334.

(Continued)

*Primary Examiner* — Melvin C Mayes
*Assistant Examiner* — Douglas Call (57) ABSTRACT

Systems and methods for thermally decomposing hydrocarbon feedstock may comprise a hydrocarbon feedstock, a non-oxidizing carrier gas, one or more heat exchangers, and a reaction chamber. The carrier gas may be used to transfer heat to the hydrocarbon feedstock. The heat exchanger(s) may be configured to heat the carrier gas. And the reaction chamber may be configured to receive hydrocarbon feedstock and heated carrier gas. Inside the reaction chamber, the hydrocarbon feedstock and the heated carrier gas may mix with one another causing the thermal decomposition reaction. The thermal decomposition reaction occurs in a substantially oxidant-free environment thereby eliminating or greatly reducing the production of carbon oxide byproducts. Hydrogen gas may be separated from a gaseous product stream that is thereafter collected from the reaction chamber. A portion of the gaseous product stream may be thermally coupled to the carrier gas and may thereafter be recycled through the system.

18 Claims, 6 Drawing Sheets

(56) References Cited

U.S. PATENT DOCUMENTS

| | | | |
|---|---|---|---|
| 5,935,293 A | | 8/1999 | Detering et al. |
| 5,997,837 A | | 12/1999 | Lynum et al. |
| 6,068,827 A | * | 5/2000 | Lynum et al. ............... 423/458 |
| 6,395,107 B1 | | 5/2002 | Subramanian |
| 6,395,197 B1 | * | 5/2002 | Detering et al. ............ 252/373 |
| 6,572,837 B1 | | 6/2003 | Holland et al. |
| 6,641,625 B1 | | 11/2003 | Clawson et al. |
| 6,670,058 B2 | | 12/2003 | Muradov |
| 7,208,647 B2 | | 4/2007 | Peterson et al. |
| 7,288,690 B2 | | 10/2007 | Bellet et al. |
| 7,332,146 B1 | | 2/2008 | Huang et al. |
| 7,563,525 B2 | | 7/2009 | Ennis |
| 7,588,746 B1 | | 9/2009 | Muradov et al. |
| 2002/0007594 A1 | * | 1/2002 | Muradov ....................... 48/78 |
| 2002/0151604 A1 | | 10/2002 | Detering et al. |
| 2002/0160125 A1 | | 10/2002 | Johnson et al. |
| 2003/0223305 A1 | | 12/2003 | Halsall et al. |
| 2004/0084294 A1 | | 5/2004 | Hogan |
| 2006/0116543 A1 | | 6/2006 | Bellet et al. |
| 2006/0266637 A1 | | 11/2006 | Gutsol et al. |
| 2007/0111051 A1 | | 5/2007 | Muradov et al. |
| 2008/0190818 A1 | | 8/2008 | Dana et al. |
| 2009/0060805 A1 | * | 3/2009 | Muradov et al. ......... 422/186.04 |
| 2009/0230359 A1 | * | 9/2009 | Guvelioglu et al. .......... 252/373 |
| 2010/0011778 A1 | | 1/2010 | Knight et al. |
| 2010/0146856 A1 | | 6/2010 | Zamansky et al. |
| 2012/0048064 A1 | | 3/2012 | Kasper et al. |

OTHER PUBLICATIONS

Popov et al., "Natural gas pyrolysis in the regenerative gas heater Part II: Natural gas pyrolysis in the 'free volume' of the regenerative gas heater", International Journal of Hydrogen Energy 24 (1999), pp. 335-339.

Shpilrain et al., "Comparative analysis of different natural gas pyrolysis methods", International Journal of Hydrogen Energy 24 (1999), pp. 613-624.

Abbas et al., "Hydrogen production by methane decomposition: A review", International Journal of Hydrogen Energy 35 (2010), pp. 1160-1190.

Muradov, "Carbon-Free Production of Hydrogen by Catalytic Pyrolysis of Hydrocarbon Fuel", Energy & Fuels 1998, 12, pp. 41-48.

Rahman et al., "Catalytic decomposition of methane for hydrogen production", Topics in Catalysis vol. 37, Nos. 2-4, Apr. 2006, pp. 137-145.

PCT International Search Report; International App. No. PCT/US13/72248; Mar. 27, 2014.

PCT International Search Report; International App. No. PCT/US13/72240; May 20, 2014; pp. 1-4.

* cited by examiner

SYSTEMS AND METHODS FOR PRODUCING HYDROGEN GAS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. 13/691,552, entitled SYSTEMS AND METHODS FOR PRODUCING HYDROGEN GAS, naming Roderick A. Hyde and Lowell L Wood, Jr. as inventors, filed 30 Nov. 2012, is related to the present application.

U.S. patent application Ser. No. 13/691,585, entitled SYSTEMS AND METHODS FOR PRODUCING HYDROGEN GAS, naming Roderick A. Hyde and Lowell L Wood, Jr. as inventors, filed 30 Nov. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates generally to systems and methods for producing hydrogen gas. More particularly, the present disclosure relates to systems and methods for producing hydrogen gas from the thermal decomposition of hydrocarbons.

SUMMARY

The various embodiments disclosed herein relate to the production of hydrogen gas. The disclosure provides for both systems and methods for producing hydrogen gas from the thermal decomposition of hydrocarbons. In the embodiments disclosed herein, the thermal decomposition reaction occurs in a substantially oxidant-free environment thereby eliminating or greatly reducing the production of carbon oxide byproducts.

An exemplary system may comprise hydrocarbon feedstock, a supply of non-oxidative carrier gas, one or more heat exchangers, and a reaction chamber. The hydrocarbon feedstock is the source of hydrogen gas to be produced. The carrier gas may be used to transfer heat to the hydrocarbon feedstock. The one or more heat exchangers may be configured to heat the carrier gas. And the reaction chamber may be configured to receive a volume of hydrocarbon feedstock and a volume of heated carrier gas.

Inside the reaction chamber, the hydrocarbon feedstock and the heated carrier gas may directly mix with one another. Mixing the hydrocarbon feedstock with the heated carrier gas may result in heat being transferred from the heated carrier gas to the hydrocarbon feedstock. When a sufficient amount of heat has been transferred to the hydrocarbon feedstock, the hydrocarbon feedstock may thermally decompose to a product that includes hydrogen gas and carbon substances.

A gaseous product stream may thereafter be collected and removed from the reaction chamber. The gaseous product stream may comprise hydrogen gas and carrier gas. The gaseous product stream also may be relatively hot. The heat within the gaseous product stream may be further utilized by the system. For example, the gaseous product stream may be thermally coupled to a volume of carrier gas that is to be used in subsequent thermal decomposition reactions. Hydrogen gas may be separated from the gaseous product stream, and at least a portion of the gaseous product stream may be recycled through the system.

Further disclosed herein are various systems and methods for heating the non-oxidative carrier gas. The carrier gas may be heated either directly or indirectly. When heating the carrier gas indirectly, one or more heat exchangers may be configured to transfer heat from one or more heat sources to the carrier gas. The one or more heat sources may generate heat. Exemplary heat sources include combustion heating systems, electrical heating systems, radiative heating systems, and plasma heating systems. The heat sources may further be either catalytic or non-catalytic.

Also disclosed herein are various systems and methods for delivering the carrier gas to the reaction chamber. For example, the carrier gas may be delivered into the reaction chamber using either a high speed injection system or method or a low speed injection system or method. The high speed injection system or method may comprise one or more discrete injectors, and each discrete injector may have a nozzle. The low speed injection system or method may comprise a reaction chamber having one or more porous walls. The reaction chamber may further be configured such that the carrier gas may permeate through the one or more porous walls and into the reaction chamber.

In certain embodiments disclosed herein, the hydrocarbon feedstock may be heated without the use of a carrier gas. For example, the hydrocarbon feedstock may be heated by contacting a hot surface. The hot surface may be a wall of the reaction chamber. In other embodiments, the hot surface may be a surface of the thermal matrix of a regenerative heat exchanger. In yet other embodiments, the hot surface may be a surface of a heat exchanger.

Further disclosed herein are systems and methods for disrupting the buildup of carbon substances on one or more selected surfaces. The one or more selected surfaces may be surfaces that are within the reaction chamber. In some embodiments, ultrasonic agitation may be used to disrupt the buildup of the carbon substances. The ultrasonic agitation may be generated from a variety of sources including mechanical, electrical, piezoelectric, and/or magnetostrictive generators. One or more parameters of the ultrasonic agitation may be varied as needed or desired.

These and other aspects of the present disclosure will be discussed in greater detail hereinafter.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

The various embodiments disclosed herein relate to the production of hydrogen gas. As set forth in more detail below, the disclosure provides embodiments for both systems and methods for producing hydrogen gas from the thermal decomposition of hydrocarbons. For example, a system may comprise hydrocarbon feedstock, a supply of non-oxidative carrier gas, one or more heat exchangers, and a reaction chamber. The hydrocarbon feedstock is the source of hydrogen gas to be produced. The carrier gas may be used to transfer heat to the hydrocarbon feedstock. The one or more heat exchangers may be configured to heat the carrier gas. And the reaction chamber may be configured to receive a volume of hydrocarbon feedstock and a volume of heated carrier gas. Additionally, the reaction chamber may provide an environment for the thermal decomposition reaction to occur.

It is contemplated that the system may be configured such that a volume of hydrocarbon feedstock and a volume of carrier gas may each be individually delivered to the reaction chamber. Before entering the reaction chamber, the carrier gas may pass through the one or more heat exchangers. The one or more heat exchangers may be coupled to one or more heat sources. By being coupled to one or more heat sources and the carrier gas, the one or more heat exchangers may be configured to draw heat from the one or more heat sources and transfer the heat to the carrier gas. The carrier gas may therefore be substantially hot when it is delivered into the reaction chamber.

Inside the reaction chamber, the hydrocarbon feedstock and the heated carrier gas may rapidly mix or otherwise blend with one another. Mixing the hydrocarbon feedstock with the heated carrier gas in this manner may result in heat being transferred from the carrier gas to the hydrocarbon feedstock. A potential advantage of transferring heat to the hydrocarbon feedstock in this fashion is a reduction of carbon buildup on the walls of the reaction chamber, as may occur if heat transfer is based upon thermal conduction from such walls. Once a sufficient amount of heat has been transferred to the hydrocarbon feedstock, the hydrocarbon feedstock may thermally decompose to a product that comprises hydrogen gas and carbon substances.

A gaseous product stream may thereafter be collected and removed from the reaction chamber. The gaseous product stream may comprise hydrogen gas and carrier gas. In certain embodiments, the gaseous product stream may be relatively hot. The heat within the gaseous product stream may be further utilized by the system. For example, the gaseous product stream may be thermally coupled to a volume of carrier gas that is to be used in subsequent thermal decomposition reactions, thereby reducing the net energy required to produce a given amount of hydrogen gas. In some embodiments, thermally coupling the gaseous product stream to the carrier gas comprises use of a heat exchanger. Hydrogen gas may be separated from the gaseous product stream either before or after thermally coupling the gaseous product stream to the carrier gas. At least a portion of the gaseous product stream may further be recycled through the system.

Further disclosed herein are various systems and methods for heating the carrier gas. The carrier gas may be heated either directly or indirectly. When heating the carrier gas indirectly, one or more heat exchangers may be configured to transfer heat from one or more heat sources to the carrier gas. The one or more heat sources may generate heat. Exemplary heat sources include combustion heating systems, electrical heating systems, radiative heating systems, and plasma heating systems. The heat source(s) may further be either catalytic or non-catalytic.

Also disclosed herein are various systems and methods for delivering the carrier gas to the reaction chamber. For example, the carrier gas may be delivered into the reaction chamber using either a high speed injection system or method or a low speed injection system or method. The high speed injection system or method may comprise one or more discrete injectors. Each discrete injector may have a nozzle. The low speed injection system or method may comprise a reaction chamber having one or more porous walls. The reaction chamber may further be configured such that the carrier gas may permeate through the one or more porous walls and into the reaction chamber.

In certain embodiments disclosed herein, the hydrocarbon feedstock may be heated without the use of a carrier gas. For example, the hydrocarbon feedstock may be heated by contacting a hot surface. The hot surface may be a surface of a fluid or a solid. The hot surface may be a wall of the reaction chamber. In other embodiments, the hot surface may be a surface of the thermal matrix of a regenerative heat exchanger. In yet other embodiments, the hot surface may be a surface of a heat exchanger.

Further disclosed herein are systems and methods for disrupting the buildup of carbon substances on one or more selected surfaces. The one or more selected surfaces may be surfaces that are within the reaction chamber. In some embodiments, ultrasonic agitation may be used to disrupt the buildup of the carbon substances. The ultrasonic agitation may be generated from a variety of sources including mechanical, electrical, piezoelectric, and/or magnetostrictive generators. One or more parameters of the ultrasonic agitation may be varied as needed or desired.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

Figure 1:
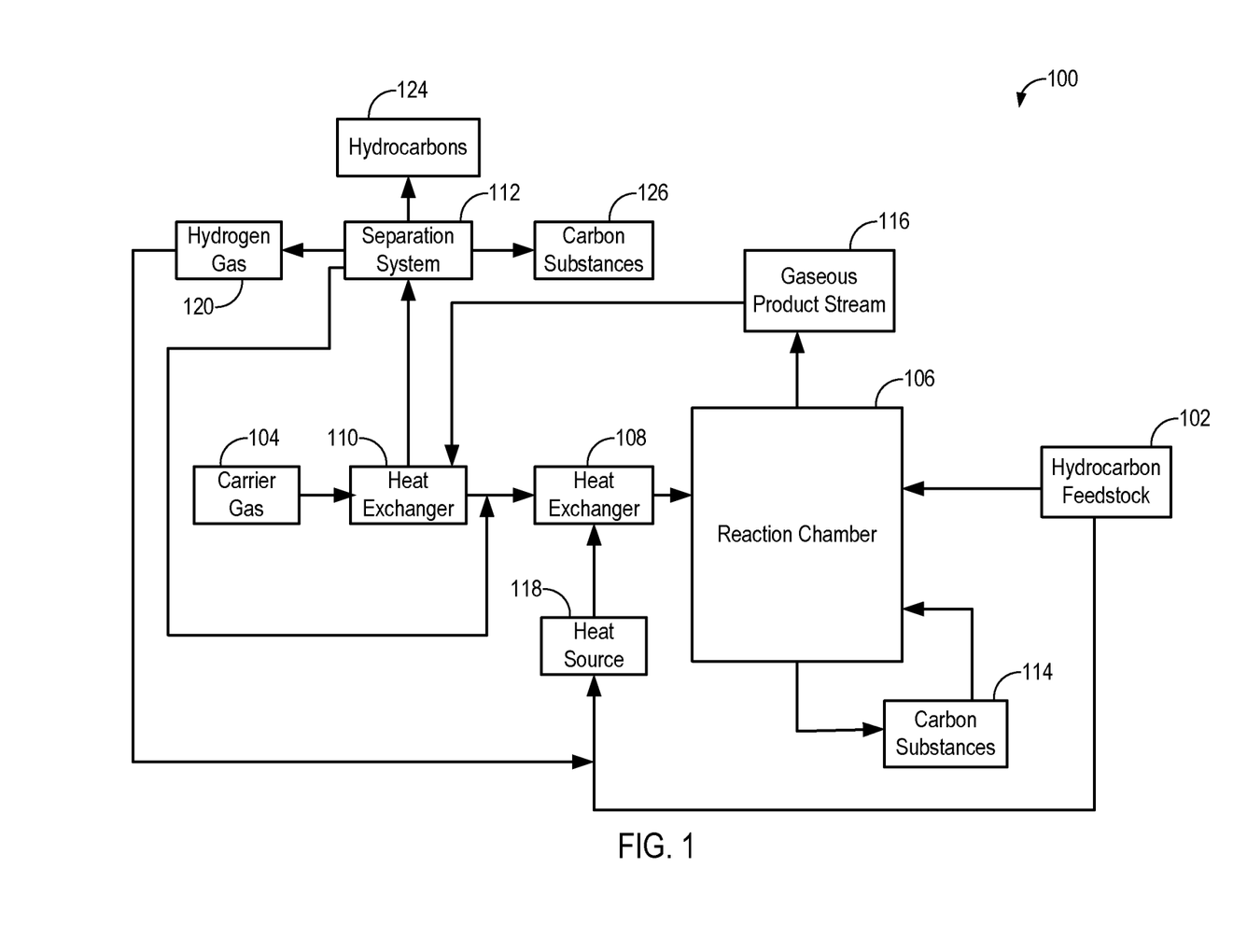
FIG. 1 is a schematic diagram of a system for producing hydrogen gas, according to an embodiment of the present disclosure.

FIG. 1 is a schematic diagram of a system 100 for producing hydrogen gas 120 according to an embodiment of the present disclosure. As shown in the illustrated embodiment, the system 100 may comprise a hydrocarbon feedstock 102, a supply of non-oxidative carrier gas 104, one or more heat exchangers 108, 110, and a reaction chamber 106.

The hydrocarbon feedstock 102 is the originating source of the hydrogen gas 120 that may be produced in accordance with the present disclosure. In some embodiments, the hydrocarbon feedstock 102 comprises gaseous hydrocarbons such as natural gas. However, the hydrocarbon feedstock 102 may include any variety of hydrocarbons. For example, in an embodiment, the hydrocarbon feedstock 102 comprises saturated hydrocarbons. In another embodiment, the hydrocarbon feedstock 102 comprises unsaturated hydrocarbons. In another embodiment, the hydrocarbon feedstock 102 comprises aromatic hydrocarbons. In yet another embodiment, the hydrocarbon feedstock 102 comprises two or more of the following: saturated hydrocarbons, unsaturated hydrocarbons, and aromatic hydrocarbons.

In certain embodiments, the hydrocarbon feedstock 102 comprises one or more light hydrocarbons having the general formula $C_nH_m$, wherein n is 1, 2, 3 or 4, and m is independently selected from 2, 4, 6, 8 or 10. For example, in an embodiment, the hydrocarbon feedstock 102 comprises $CH_4$. In another embodiment, the hydrocarbon feedstock 102 comprises $C_2H_2$. In another embodiment, the hydrocarbon feedstock 102 comprises $C_2H_4$. In another embodiment, the hydrocarbon feedstock 102 comprises $C_2H_6$. In another embodiment, the hydrocarbon feedstock 102 comprises $C_3H_8$. In another embodiment, the hydrocarbon feedstock 102 comprises $C_4H_{10}$. In another embodiment, the hydrocarbon feedstock 102 comprises one of more of the following: $CH_4$, $C_2H_2$, $C_2H_4$, $C_2H_6$, $C_3H_8$, and $C_4H_{10}$. In yet another embodiment, the hydrocarbon feedstock 102 comprises a mixture of two or more of the following: $CH_4$, $C_2H_2$, $C_2H_4$, $C_2H_6$, $C_3H_8$, and $C_4H_{10}$. The hydrocarbon feedstock 102, however, need not be limited to only light hydrocarbons. Rather, the hydrocarbon feedstock 102 may comprise one or more hydrocarbons that are not light hydrocarbons.

To increase the hydrogen gas yield of the system 100 (i.e., the amount of hydrogen gas produced per volume of hydrocarbon feedstock 102), it may be desirous that the hydrocarbon feedstock 102 comprise one or more hydrocarbons that have a relatively high hydrogen to carbon content. For example, it may be desirous that the hydrocarbon feedstock 102 comprise hydrocarbons that have a hydrogen to carbon ratio of at least 2:1, 3:1, or 4:1. However, it is not a requirement for the hydrocarbon feedstock 102 to comprise one or more hydrocarbons that have a relatively high hydrogen to carbon content.

The hydrocarbon feedstock 102 may be filtered or otherwise purified prior to being introduced into the system 100. As can be appreciated, thermal decomposition of hydrocarbon feedstock 102 that is substantially pure may have a higher hydrogen gas yield as compared to hydrocarbon feedstock 102 that contains a high amount of impurities. Accordingly, in certain embodiments, the hydrocarbon feedstock 102 is substantially free of impurities. In some embodiments, the hydrocarbon feedstock 102 is substantially free of non-hydrocarbons. In some embodiments, the hydrocarbon feedstock 102 is substantially free of oxidative compounds. Alternatively, the hydrocarbon feedstock 102 need not be substantially pure and may contain minor amounts of impurities. Additionally, the hydrocarbon feedstock 102 may comprise a mixture of one or more hydrocarbons and one or more non-hydrocarbons.

The non-oxidative carrier gas 104 may be used to transfer heat or thermal energy to the hydrocarbon feedstock 102. By using a non-oxidative carrier gas 104 to heat the hydrocarbon feedstock 102, the thermal decomposition reaction may occur in a substantially oxidant-free environment thereby eliminating or greatly reducing the production of carbon oxide byproducts. A wide variety of non-oxidative gases may be used as the carrier gas 104. For example, it is contemplated that any non-oxidative gas that does not easily undergo chemical reactions when being subjected to heat can be used as the carrier gas 104.

The carrier gas 104 may comprise one or more inert gases. The inert gases may be, for example, noble gases. In an embodiment, the carrier gas comprises hydrogen, i.e., hydrogen may serve both as the carrier gas as well as a product of the hydrocarbon decomposition. In another embodiment, the carrier gas comprises nitrogen. In another embodiment, the carrier gas comprises argon. In another embodiment, the carrier gas comprises helium. In yet another embodiment, the carrier gas comprises a mixture of two or more of the following: hydrogen, nitrogen, argon, and helium.

The carrier gas 104 may be substantially free of impurities. Alternatively, the carrier gas 104 need not be substantially pure and may contain minor amounts of impurities and/or additional compounds. Notwithstanding, it is desirous that the carrier gas 104 be substantially free of oxidative compounds. Accordingly, in some embodiments, the carrier gas 104 is substantially free of oxidative compounds.

Other ways of heating or transferring thermal energy to the hydrocarbon feedstock 102 in a non-oxidative manner are also contemplated. In certain embodiments, for example, the hydrocarbon feedstock 102 may be heated without the use of a carrier gas 104. For example, the hydrocarbon feedstock 102 may be heated by contacting a hot surface. The hot surface may be a surface of a fluid, such as a liquid. Alternatively, the hot surface may be a surface of a solid. In some embodiments, the hot surface may be one or more walls of the reaction chamber 106. In other embodiments, the hot surface may be a surface of the thermal matrix of a regenerative heat exchanger. In yet other embodiments, the hot surface may be one or more surfaces of a heat exchanger. The heat exchanger may be coupled to one or more heat sources. Exemplary heat exchangers and heat sources that may be used in accordance with the present disclosure are further discussed below. In still other embodiments, the hydrocarbon feedstock 102 may be heated by one or more heat sources directly, without the use of a heat exchanger. In still other embodiments, the hydrocarbon feedstock 102 may be preheated prior to delivery into the reaction chamber 106.

With continued reference to FIG. 1, the system 100 may be configured such that a first volume of hydrocarbon feedstock 102 and a first volume of carrier gas 104 may each individually be delivered to the reaction chamber 106. The system 100 may further be configured such that the first volume of carrier gas 104 passes through one or more heat exchangers 108, 110 before entering the reaction chamber 106. For example, as shown in FIG. 1, the first volume of carrier gas 104 is delivered to and passes through a first heat exchanger 108 and a second heat exchanger 110. Each of the heat exchangers 108, 110 may be configured to transfer heat or thermal energy to the first volume of carrier gas 104. Accordingly, the first volume of carrier gas 104 may be substantially hot when it enters the reaction chamber 106.

Various types of heat exchangers are known in the art for heating gases, any of which may be used in accordance with the present invention. For example, in some embodiments, the system 100 may comprise a cyclical flow regenerative heat exchanger commonly known as a regenerator. In other embodiments, the system 100 may comprise a countercurrent heat exchanger (e.g., recuperator). In some embodiments, the system may comprise a continuous flow heat exchanger. In yet other embodiments, the system may comprise two or more different types of heat exchangers (e.g., one regenerative heat exchanger and one countercurrent heat exchanger).

Each heat exchanger may comprise one or more heat exchanger fluids. In some embodiments, the heat exchanger fluids may be gaseous; in other embodiments, the heat exchanger fluids may be liquid. The heat exchanger fluid may be enclosed within the heat exchanger. The heat exchanger fluid may therefore circulate within the heat exchanger. In other embodiments, the heat exchanger fluid may not be enclosed within the heat exchanger; rather, the heat exchanger fluid may flow in and out of the heat exchanger. It is contemplated that the heat exchanger fluid may circulate in a closed-loop manner. By circulating in a closed-loop manner, the heat exchanger fluid may be retained and recycled. Further, energy loss may be minimized when circulating the heat exchanger fluid in a closed-loop manner.

As shown in FIG. 1, the system may further comprise one or more heat sources 118. The one or more heat sources 118 may generate and provide the system 100 with the heat or thermal energy that is necessary for the decomposition reaction to occur. Further, the one or more heat sources 118 may be coupled to one or more heat exchangers 108, 110. For example, in the illustrated embodiment of FIG. 1, the heat source 118 is coupled to the first heat exchanger 108.

Any variety of heat sources 118 may be used. For example, the heat source 118 may comprise an electrical heating system, a radiative heating system (including thermal and/or optical radiation systems), a combustion heating system, or a plasma heating system. The heat source 118 may further be either catalytic or non-catalytic. It is contemplated that the thermal energy or heat generated by the heat source 118 may be transferred to the first heat exchanger 108. The first heat exchanger 108 may then transfer heat to the first volume of carrier gas 104. In other embodiments, the heat source 118 may transfer heat directly to the first volume of carrier gas 104, or directly to the first volume of hydrocarbon feedstock 102, without the use of a heat exchanger 108.

As previously discussed, an exemplary heat source 118 may comprise a combustion heating system. The combustion heating system may generate heat or energy from the combustion of one or more combustible gases. The one or more combustible gases may comprise a portion of the hydrocarbon feedstock 102, as is illustrated in FIG. 1. In some embodiments, the one or more combustible gases comprise hydrocarbon feedstock 102 and a second combustible gas that is other than hydrocarbon feedstock 102. For example, the second combustible gas may comprise air. In another embodiment, the second combustible gas may comprise oxygen.

In some embodiments, the one or more combustible gases comprise hydrogen gas. The hydrogen gas may be at a temperature that is greater than ambient temperature. In some embodiments, the hydrogen gas used by the combustion system may be derived from the first gaseous product stream 116. Accordingly, a portion of the hydrogen gas 120 produced by the system 100 may be delivered to the heat source 118 and used by the combustion system to generate heat. In some embodiments, the one or more combustible gases comprise hydrogen gas and a second combustible gas that is other than hydrogen gas. For example, the second combustible gas may comprise air. In another embodiment, the second combustible gas may comprise oxygen.

With continued reference to FIG. 1, after passing through the one or more heat exchangers 108, 110, the first volume of carrier gas 104 may be delivered to the reaction chamber 106. In some embodiments, the first volume of carrier gas 104 may be delivered into the reaction chamber 106 through the use of a high speed injection system or method. The high speed injection system or method may convert at least a portion of the static pressure of the first volume of carrier gas 104 into dynamic pressure. Exemplary high speed injection systems or methods may comprise one or more discrete injectors through which the first volume of carrier gas may be passed. In some embodiments, the one or more discrete injectors each comprise a nozzle. Any variety and shape of nozzles may be utilized in accordance with the present disclosure.

The one or more discrete injectors may be coupled or otherwise connected to the reaction chamber 106 at one or more injection sites. The one or more discrete injectors may further be configured and aligned such that injection of, or passing, the first volume of carrier gas 104 through the one or more discrete injectors may aid in keeping the byproducts of the thermal decomposition reaction (e.g., carbon substances) from depositing on and blocking the one or more injection sites.

In other embodiments, the first volume of carrier gas 104 may be delivered into the reaction chamber 106 through the use of a low speed injection system or method. Exemplary low speed injection systems or methods comprise a reaction chamber 106 comprising one or more porous walls. The first volume of carrier gas 104 may permeate or otherwise be passed into the reaction chamber 106 through the one or more porous walls. The rate at which the first volume of carrier gas 104 permeates or is otherwise passed through the one or more porous walls of the reaction chamber 106 may be varied by controlling and adjusting the pressure differential between the inside and the outside of the reaction chamber 106. The higher the pressure differential (i.e., higher pressure on the outside of the reaction chamber than on the inside of the reaction chamber), the faster the first volume of carrier gas 104 may permeate through the one or more porous walls.

It is contemplated that the high speed and low speed injection systems or methods disclosed herein may be used to deliver the first volume of carrier gas 104 into the reaction chamber 106 either continuously or in batches. For example, the injection systems or methods may continuously and constantly deliver the first volume and subsequent volumes carrier gas 104 into the reaction chamber 106. Alternatively, the injection systems or methods disclosed herein may be used to deliver only batches or certain volumes (e.g., a first volume, a second volume, etc.) of the carrier gas 104 into the reaction chamber 106 at specified time intervals.

It is further contemplated that substantially all of the first volume of carrier gas 104 that has been heated by the one or more heat exchangers 108, 110 may be delivered into the reaction chamber 106 by either the high speed or low speed injection system or method. Alternatively, in other embodiments, only a portion of the first volume of carrier gas 104 may be delivered to the reaction chamber 106 by either the high speed or low speed injection system or method.

The reaction chamber 106 may be configured to receive the first volume of heated carrier gas 104 and the first volume of hydrocarbon feedstock 102. The reaction chamber 106 may be made of any suitable material that is able to withstand the extreme temperatures necessary to thermally decompose the hydrocarbon feedstock 102. The size and shape of the reaction chamber 106 may be varied. For example, the reaction chamber 106 may be substantially cylindrical. The reaction chamber 106 also may be mounted horizontally or vertically. Inside the reaction chamber 106, the first volume of carrier gas 104 and the first volume of hydrocarbon feedstock 102 may directly mix or otherwise blend with one another. Mixing the first volume of hydrocarbon feedstock 102 with the first volume of carrier gas 104 in this manner may result in heat being transferred from the first volume of carrier gas 104 to the first volume of hydrocarbon feedstock 102. Once the first volume of hydrocarbon feedstock 102 is sufficiently heated, the first volume of hydrocarbon feedstock 102 may thermally decompose into a product comprising hydrogen gas and carbon substances. In some embodiments, the decomposition product further comprises hydrocarbons. These hydrocarbons may be residual hydrocarbons originating from the hydrocarbon feedstock 104 and may include unreacted hydrocarbons and/or partially decomposed hydrocarbons.

As shown in FIG. 1, at least a portion of the carbon substances 114 may be collected and removed from the reaction chamber 106. All or a portion of the carbon substances 114 may then be discarded from the system 100. The carbon substances 114 may include a variety of carbonaceous materials and are naturally free from oxygen, as sources of oxygen are excluded from the decomposition reaction. In some embodiments, the carbon substances 114 comprise black carbon. In another embodiment, the carbon substances 114 comprise elemental carbon. In another embodiment, the carbon substances 114 comprise pyrocarbon. In another embodiment, the carbon substances 114 comprise soot. In yet other embodiments, the carbon substances 114 comprise one or more of black carbon, pyrocarbon, elemental carbon, and soot.

In certain embodiments, at least a portion of the carbon substances 114 may be used as a catalyst in the decomposition of hydrocarbon feedstock 102. For example, in some embodiments, once carbon substances 114 are produced from the thermal decomposition of a portion of the first volume of hydrocarbon feedstock 102, at least a portion of the carbon substances may act as a catalyst in the decomposition of the remaining portion of the first volume of hydrocarbon feedstock 102 within the reaction chamber. In other embodiments, at least a portion of the carbon substances 114 may act as a catalyst in the decomposition of subsequent volumes (e.g., a second or third volume) of hydrocarbon feedstock 102 that may be delivered to the reaction chamber for subsequent decomposition reactions. In yet other embodiments, at least a portion of the carbon substances 114 that have been collected and removed from the reaction chamber 106 may be delivered back into the reaction chamber 106 and used as a catalyst in the subsequent decomposition of subsequent volumes (e.g., a second or third volume) of hydrocarbon feedstock 102, as illustrated in FIG. 1.

Carbon substances may be deposited on various surfaces of the reaction chamber 106. As set forth in more detail below, in some embodiments, ultrasonic agitation may be used to disrupt a buildup of the carbon substances on one or more selected surfaces within the reaction chamber 106. For example, ultrasonic agitation may be used to disrupt the buildup of carbon substances on the surfaces of the reaction chamber or on the one or more discrete injectors or nozzles that may be used in delivering the carrier gas 104 into the reaction chamber 106.

With continued reference to FIG. 1, in some embodiments, a first gaseous product stream 116 may be collected and removed from the reaction chamber 106. The first gaseous product stream 116 may comprise hydrogen gas produced from the decomposition reaction. The first gaseous product stream 116 may further comprise carrier gas 104. The carrier gas 104 may be derived from the first volume of carrier gas 104 that was used to transfer heat to the first volume of hydrocarbon feedstock 102 in the decomposition reaction. In some embodiments, the first gaseous product stream 116 further comprises hydrocarbons. These hydrocarbons may be residual hydrocarbons originating from the hydrocarbon feedstock 102 that was not fully decomposed in the reaction chamber 106. For example, these hydrocarbons may include unreacted hydrocarbons and/or partially decomposed hydrocarbons. In other embodiments, the first gaseous product stream 116 is substantially free from hydrocarbons. In yet other embodiments, as discussed below, the first gaseous product stream 116 may be filtered to remove hydrocarbons.

The first gaseous product stream 116 may further comprise gasborne carbon substances. For example, carbon substances produced from the decomposition reaction may be suspended in the gaseous product stream 116. In other embodiments, the first gaseous product stream 116 may be substantially free from gasborne carbon substances. In yet other embodiments, as discussed below, the first gaseous product stream 116 may be filtered to remove gasborne carbon substances.

It is contemplated that the first gaseous product stream 116 may be relatively hot. Accordingly, the first gaseous product stream 116 may be at a temperature that is above ambient temperature. It may be desirous to recapture energy from the hot first gaseous product stream 116 and further use it within the system 100. This may be accomplished in several ways. For example, heat from at least a portion of the first gaseous product stream 116 may be thermally coupled to a second volume of carrier gas 104 that is to be used in subsequent decomposition reactions.

Thermal coupling heat from a portion of the first gaseous product stream 116 to the second volume of carrier gas 104 may be accomplished in a variety of ways. In the illustrated embodiment of FIG. 1, for example, the first gaseous product stream 116 may be delivered to the second heat exchanger 110. The second heat exchanger 110 may be any variety of heat exchangers previously discussed (e.g., a regenerator, recuperator, continuous flow heat exchanger, etc.), and may be configured such that it removes heat from the first gaseous product stream 116 and transfers the heat to the second volume of carrier gas 104 that is being delivered to the reaction chamber for subsequent decomposition reactions. As further illustrated, the second volume of carrier gas 104 may be delivered to second heat exchanger 110 prior to being delivered to the reaction chamber 106. Still further, the second volume of carrier gas 104 may be delivered to the second heat exchanger 110 prior to being delivered to the first heat exchanger 108. Accordingly, the second volume of carrier gas 104 may be first heated by the second heat exchanger 110, which is coupled to the first gaseous product stream 116, after which the second volume of carrier gas 104 may be further heated by the first heat exchanger 108, which is coupled to a heat source 118. It is contemplated that the first heat exchanger 108, coupled to a heat source 118, may be configured to heat the second volume of carrier gas 104 to a higher temperature than the second heat exchanger 110 which is coupled to the first gaseous product stream 116.

In the illustrated embodiment of FIG. 1, the system 100 comprises first and second heat exchangers 108, 110. In some embodiments, the first and second heat exchangers 108, 110 may be configured such that they share common components. Accordingly, the first and second heat exchangers 108, 110 may, in a sense, overlap one another. In yet other embodiments, a system 100 may comprise only one heat exchanger with two or more sections that may be analogous to the first and second heat exchangers 108, 110 that are illustrated in FIG. 1. In other embodiments, the system 100 may comprise one or more additional heat exchangers, such as a third heat exchanger. Although not required, each of the heat exchangers (e.g., the first, second, and third) may be configured such that it shares common components with one or more of the other heat exchangers.

It is contemplated that the first gaseous product stream 116 may be filtered or otherwise separated into one or more components either before or after it is thermally coupled to the second volume of carrier gas 104. The separation system 112 may comprise any known systems or methods for separating and/or filtering gases. For example, in some embodiments, the separation system comprises a series of filters. The filters may be, for example, filter bags. It is further contemplated that one or more filtration systems and/or separation systems 112 may be used. As shown in FIG. 1, the first gaseous product stream 116 may be delivered to a separation system 112 after being coupled to the second volume of carrier gas 104 through the second heat exchanger 110. In other embodiments, the first gaseous product stream 116 may be delivered to a separation system 112 before being delivered to the second heat exchanger 110 or otherwise thermally coupled to the second volume of carrier gas 104. In yet other embodiments, the first gaseous product stream 116 may be delivered to one or more filtration and/or separation systems 112 prior to being delivered to the second heat exchanger 110, and delivered to one or more filtration and/or separation systems 112 after being delivered to the second heat exchanger 110. Accordingly, depending on the placement of the filtration and/or separation systems 112, either the full first gaseous product stream 116, or only a portion of the first gaseous product stream 116, may be thermally coupled to the second volume of carrier gas 104.

For example in some embodiments (such as the embodiment shown in FIG. 2), the hydrocarbons 124 and the carbon substances 126 may be removed from the first gaseous product stream 116 prior to delivering at least a portion of the first gaseous product stream 116 to the heat exchanger 110 for use in thermally coupling heat to the second volume of carrier gas 104. In such embodiments, the portion of the first gaseous product stream 116 delivered to the heat exchanger 110 may primarily comprise remnants of the first volume of carrier gas 104 and hydrogen gas 120. In another embodiment, at least a portion of hydrogen gas 120 may be removed from the first gaseous product stream 116 prior to delivering at least a portion of the first gaseous product stream 116 to the second heat exchanger 110 for use in thermally coupling heat to the second volume of carrier gas 104. In yet another embodiment, the hydrocarbons 124, carbon substances 126, and at least a portion of hydrogen gas 120 may be removed from the first gaseous product stream 116 prior to delivering at least a portion of the first gaseous product stream 116 to the heat exchanger 110 for use in thermally coupling heat to the second volume of carrier gas 104.

As set forth above, in some embodiments, the separation system 112 may be configured such that at least a portion of hydrogen gas 120 is removed from the first gaseous product stream 116. The portion of hydrogen gas 120 may be stored, sold, or further used in the system 100. For example, as shown in FIG. 1, a portion of hydrogen gas 120 may be delivered to the heat source 118 and used in the generation of additional heat for the system 100. In other embodiments, the hydrogen gas 120 may be removed from the system 100 and either sold or used for other applications.

In another embodiment, the separation system 112 may be configured such that at least a portion of the first volume of carrier gas 104 is removed from the first gaseous product stream 116. The first volume of carrier gas 104 may thereafter be recycled through the system 100 as desired.

With continued reference to FIG. 1, at least a portion of the first gaseous product stream 116 may be recycled and reused in the system 100. For example, after thermally coupling heat from at least a portion of the first gaseous product stream 116 into the second volume of carrier gas 104, the first gaseous product stream 116 may be converted into a smaller portion (e.g., a second portion) of the first gaseous product stream 116 by at least partially removing, or completely removing, hydrocarbons 124, carbon substances 126, and/or hydrogen gas 120 from the first gaseous product stream 116 through use of the separation system 112. As shown in FIG. 1, this smaller portion of the first gaseous product stream 116, which may consist primarily of remnants of the first volume of carrier gas 104, may be delivered to the first heat exchanger 108 where it is reheated and thereafter delivered to the reaction chamber 106 for use in subsequent decomposition reactions.

In another embodiment, a portion of the first gaseous product stream 116 may be delivered to another heat exchanger, e.g., a third heat exchanger. The third heat exchanger may be any of the types of heat exchangers previously discussed and may be configured such that it shares one or more common components with the first heat exchanger 108. Further, a heat source may be configured to transfer thermal energy to the third heat exchanger prior to heating the portion of the first gaseous product stream 116 with the third heat exchanger. The heat source may be any the above mentioned heat sources, such as a combustion heating system.

Although not required, it is contemplated that when recycling a portion of the first gaseous product stream 116 back through the system 100, it may be desirous to filter the first gaseous product stream 116 to remove any and all hydrocarbons and/or carbon substances either before reheating the portion of the gaseous product stream 116, or before completion of the reheating. Doing so will help prevent decomposition of hydrocarbons inside the first heat exchanger 108 (or any other heat exchanger configured to heat the first gaseous product stream 116) or on any other undesirable areas within the system 100.

As further shown in FIG. 1, recycling at least a portion of the first gaseous product stream 116 may comprise delivering at least a portion of the reheated first gaseous product stream 116 to the reaction chamber 106. Recycling at least a portion of the first gaseous product stream 116 may further comprise adding or otherwise combining at least a portion of the first gaseous product stream 116 with a second volume of carrier gas 104 that is being delivered to the reaction chamber 106 for use in a subsequent decomposition reaction. For example, in an embodiment, the portion of first gaseous product stream 116 may be combined with the second volume of carrier gas 104 prior to delivering the second volume of carrier gas 104 into the reaction chamber 106. In another embodiment, the portion of first gaseous product stream 116 may be combined with the second volume of carrier gas 104 prior to heating the second volume of carrier gas with first heat exchanger 108. In yet another embodiment, the portion of first gaseous product stream 116 may be combined with the second volume of carrier gas 104 prior to completion of the heating of the second volume of carrier gas with first heat exchanger 108.

As previously discussed, at least a portion of the first volume of carrier gas may be separated or otherwise removed from the first gaseous product stream 116 by the separation system 112. The portion of the first volume of carrier gas may then be recycled and reused in the system 100 in similar fashion to the portion of first gaseous product stream 116 previously discussed. For example, the portion of the first volume of carrier gas may be combined with the second volume of carrier gas 104 that is being delivered to the reaction chamber 106 for use in a subsequent decomposition reaction. For example, in an embodiment, the portion of the first volume of carrier gas may be combined with a second volume of carrier gas 104 prior to delivering the second volume of carrier gas 104 into the reaction chamber 106. In another embodiment, the portion of first volume of carrier gas may be combined with the second volume of carrier gas 104 prior to heating the second volume of carrier gas with the first heat exchanger 108. In yet another embodiment, the portion of first volume of carrier gas may be combined with the second volume of carrier gas 104 prior to completion of the heating of the second volume of carrier gas with first heat exchanger 108.

In certain embodiments, the portion of the first gaseous product stream, or the portion of first volume of carrier gas removed from the first gaseous product stream 116, may be compressed prior to being added or otherwise combined with the second volume of carrier gas 104. The portion of the first gaseous product stream, or the portion of first volume of carrier gas removed from the first gaseous product stream 116, may further be cooled prior to the compression. It is further contemplated that the heat removed during the cooling may be used to heat the second volume of carrier gas 104.

As can be appreciated, a second volume of hydrocarbon feedstock 102 may thereafter be delivered to the reaction chamber 106 and mixed with a portion of the first gaseous product stream 116. The second volume of hydrocarbon feedstock 102 may comprise the same composition as the first volume of hydrocarbon feedstock 102. Heat may be transferred from the portion of the first gaseous product stream 116 to the second volume of hydrocarbon feedstock 102 thereby thermally decomposing the second volume of hydrocarbon feedstock 102 into a product comprising hydrogen gas and carbon substances. A second gaseous product stream 116 comprising hydrogen gas 120 and carrier gas 104 may thereafter be collected and further cycled and recycled through the system 100 as discussed above with respect to the first gaseous product stream 116. In other embodiments, a portion of first carrier gas 104 removed from the first gaseous product stream 116, or a combined portion of the first gaseous product stream 116 and second volume of carrier gas 104, may be mixed with a second volume of hydrocarbon feedstock 102 thereby thermally decomposing the second volume of hydrocarbon feedstock 102 into a product comprising hydrogen gas and carbon substances. It is therefore contemplated that the systems and methods disclosed herein may be continuous and cyclical systems such that the carrier gas 104 and gaseous product streams 116 may be cycled and recycled through the system and used to transfer heat to additional volumes of hydrocarbon feedstock 102 within the reaction chamber 106.

Figure 2:
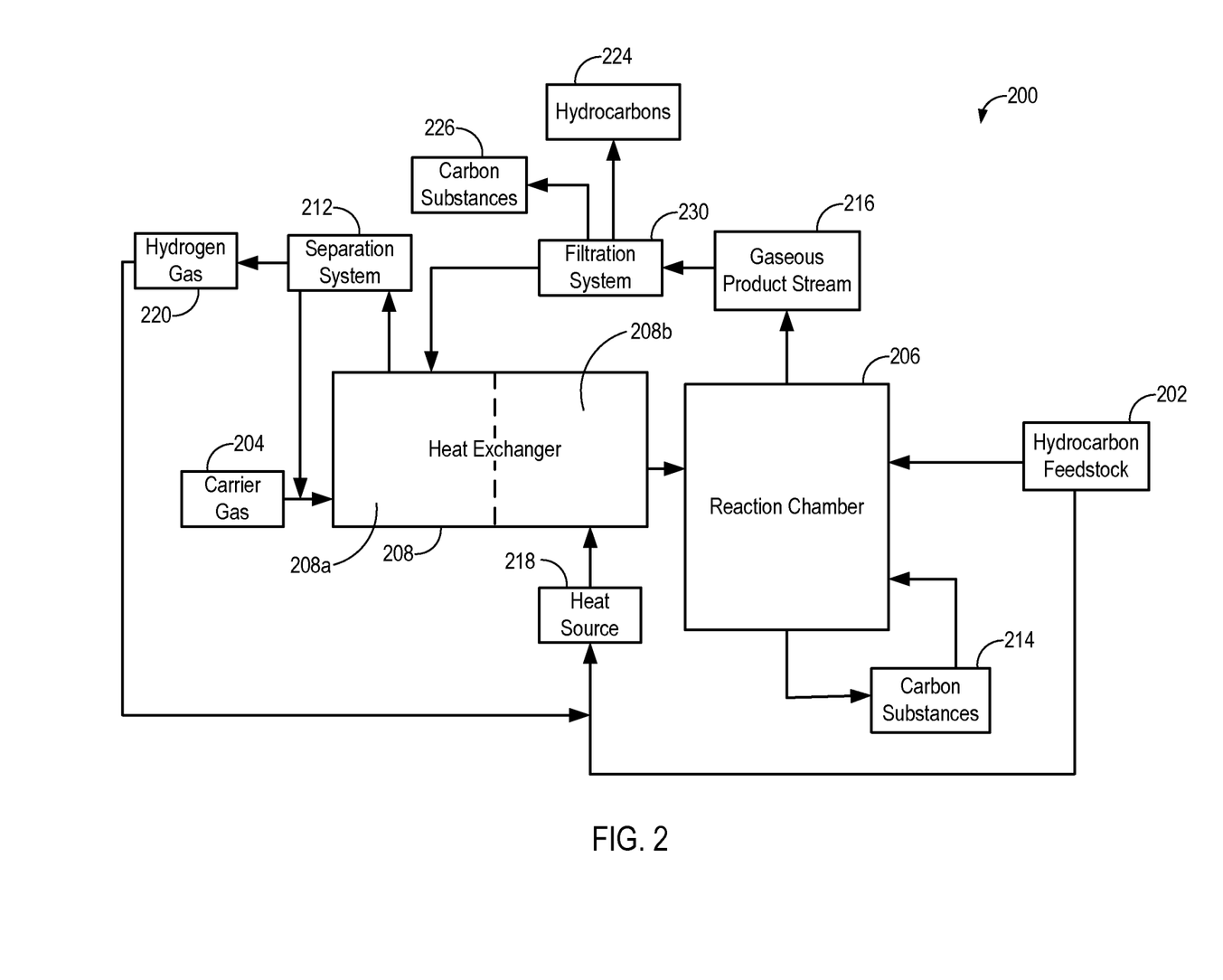
FIG. 2 is a schematic diagram of a system for producing hydrogen gas, according to another embodiment of the present disclosure.

FIG. 2 is a schematic diagram of a system 200, according to another embodiment of the present disclosure. As shown in FIG. 2, the system 200 may comprise a hydrocarbon feedstock 202, a supply of carrier gas 204, a heat exchanger 208, and a reaction chamber 206. As set forth above with respect to FIG. 1, a first volume of carrier gas 204 and a first volume of hydrocarbon feedstock 202 may each independently be delivered to the reaction chamber 206. Prior to being delivered to the reaction chamber 206, the first volume of carrier gas 204 may be heated by the heat exchanger 208.

As shown in FIG. 2, the heat exchanger 208 may be configured such that it comprises two or more sections 208a, 208b. Each section 208a, 208b may be configured to individually transfer heat to the carrier gas 204 being passed therethrough. Each section 208a, 208b may further obtain heat from different sources. For example, section 208a of the heat exchanger 208 may obtain heat from at least a portion of the first gaseous product stream 216. Section 208b may obtain heat from a separate heat source 218. Thus sections 208a and 208b of the heat exchanger 208 may be analogous in some respects with the first and second exchangers 108 and 110 discussed above in FIG. 1. In some embodiments, sections 208a and 208b of the heat exchanger 208 may comprise overlapping components. In other embodiments, sections 208a and 208b of the heat exchanger may comprise two separate and independent heat exchangers, with or without overlapping components.

As shown in FIG. 2, carbon substances 214 may be collected and removed from the system 200 as described above with respect to FIG. 1. As also shown in FIG. 2, only a portion of the first gaseous product stream 216 may be thermally coupled to the second volume of carrier gas 204. As further shown in FIG. 2, forming the portion of the first gaseous product stream 216 may comprise removing hydrocarbons 224 and/or gasborne carbon substances 226 from the first gaseous product stream 216 through use of a filtration system 230.

As also shown in FIG. 2, the portion of the first gaseous product stream 216 may be thermally coupled to the second volume of carrier gas 204 through use of the heat exchanger 208. After passing through the heat exchanger 208, the portion of the first gaseous product stream 216 may be delivered to a separation system 212. The separation system 212 may be configured to remove at least a portion of hydrogen gas 220 from the gaseous product stream 216. The portion of hydrogen gas 220 may be stored, sold, or used in the system 200. For example, a portion of the hydrogen gas 220 may be delivered to the heat source 218 and used in the generation of additional heat for the system 200. The hydrogen gas 220 may also be removed from the system 200 and used in other applications.

By removing the hydrogen gas 220 from the portion of the first gaseous product stream 216, the portion of the first gaseous product stream 216 may be converted into a second smaller portion of the first gaseous product stream 216, which may consist primarily of remnants of the first volume of carrier gas 204. The second portion of the first gaseous product stream 216 may then be added to or otherwise combined with a second volume of carrier gas 204 and recycled through the system, or it may be discarded.

Figure 3:
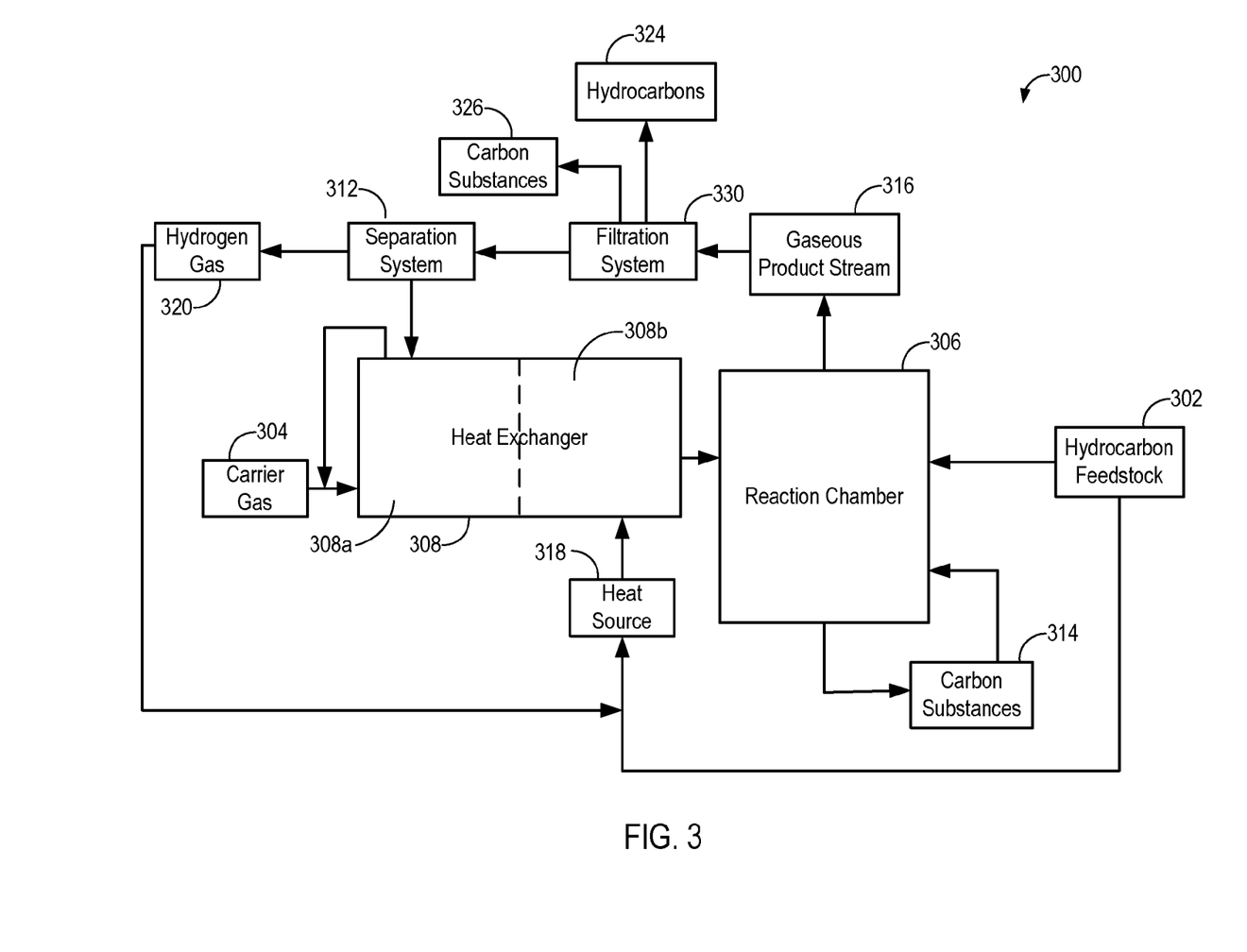
FIG. 3 is a schematic diagram of a system for producing hydrogen gas, according to another embodiment of the present disclosure.

FIG. 3 is a schematic diagram of a system 300, according to another embodiment of the present disclosure. As shown in FIG. 3, the system 300 may comprise a hydrocarbon feedstock 302, a supply of carrier gas 304, a heat exchanger 308, and a reaction chamber 306. As set forth above with respect to FIG. 1, a first volume of carrier gas 304 and a first volume of hydrocarbon feedstock 302 may each independently be delivered to the reaction chamber 306. Prior to being delivered to the reaction chamber 306, the first volume of carrier gas 304 may be heated by the heat exchanger 308.

As shown in FIG. 3, the heat exchanger 308 may be configured such that it comprises two or more sections 308a, 308b. Similar to FIG. 2, each section 308a, 308b may be configured to individually transfer heat to the carrier gas 304 being passed there through. Each section 308a, 308b may further obtain heat from different sources. For example, section 308a of the heat exchanger 308 may obtain heat from at least a portion of the first gaseous product stream 316. Section 308b may obtain heat from a separate heat source 318. Thus sections 308a and 308b of the heat exchanger 308 may be analogous in some respects with the first and second exchangers 108 and 110 discussed above in FIG. 1. In some embodiments, sections 308a and 308b of the heat exchanger 308 may comprise overlapping components. In other embodiments, sections 308a and 308b of the heat exchanger may comprise two separate and independent heat exchangers, with or without overlapping components.

In some embodiments, carbon substances 314 may be collected and removed from the system 300 as described above with respect to FIG. 1. As also shown in FIG. 3, only a portion of the first gaseous product stream 316 may be thermally coupled to the second volume of carrier gas 304. Forming the portion of the first gaseous product stream 316 may comprise removing hydrocarbons 324 and/or gasborne carbon substances 326 from the first gaseous product stream 316 through use of a filtration system 330. Forming the portion of the first gaseous product stream 316 may further comprise removing at least a portion of hydrogen gas 320 through use of a separation system 312. The portion of hydrogen gas 320 may be stored, sold, or used in the system 300. For example, a portion of the hydrogen gas 320 may be delivered to the heat source 318 and used in the generation of additional heat for the system 300. The hydrogen gas 320 may also be removed from the system 300 and used in other applications.

The portion of the first gaseous product stream 316, which may consist primarily of remnants of the first volume of carrier gas 304, may thereafter be thermally coupled to the second volume of carrier gas 304 through use of the heat exchanger 308. As shown in FIG. 1, the portion of the first gaseous product stream 316 may then exit the heat exchanger 308 and may be added to or otherwise combined with a second volume of carrier gas 304 and recycled through the system, or it may be discarded.

Figure 4:
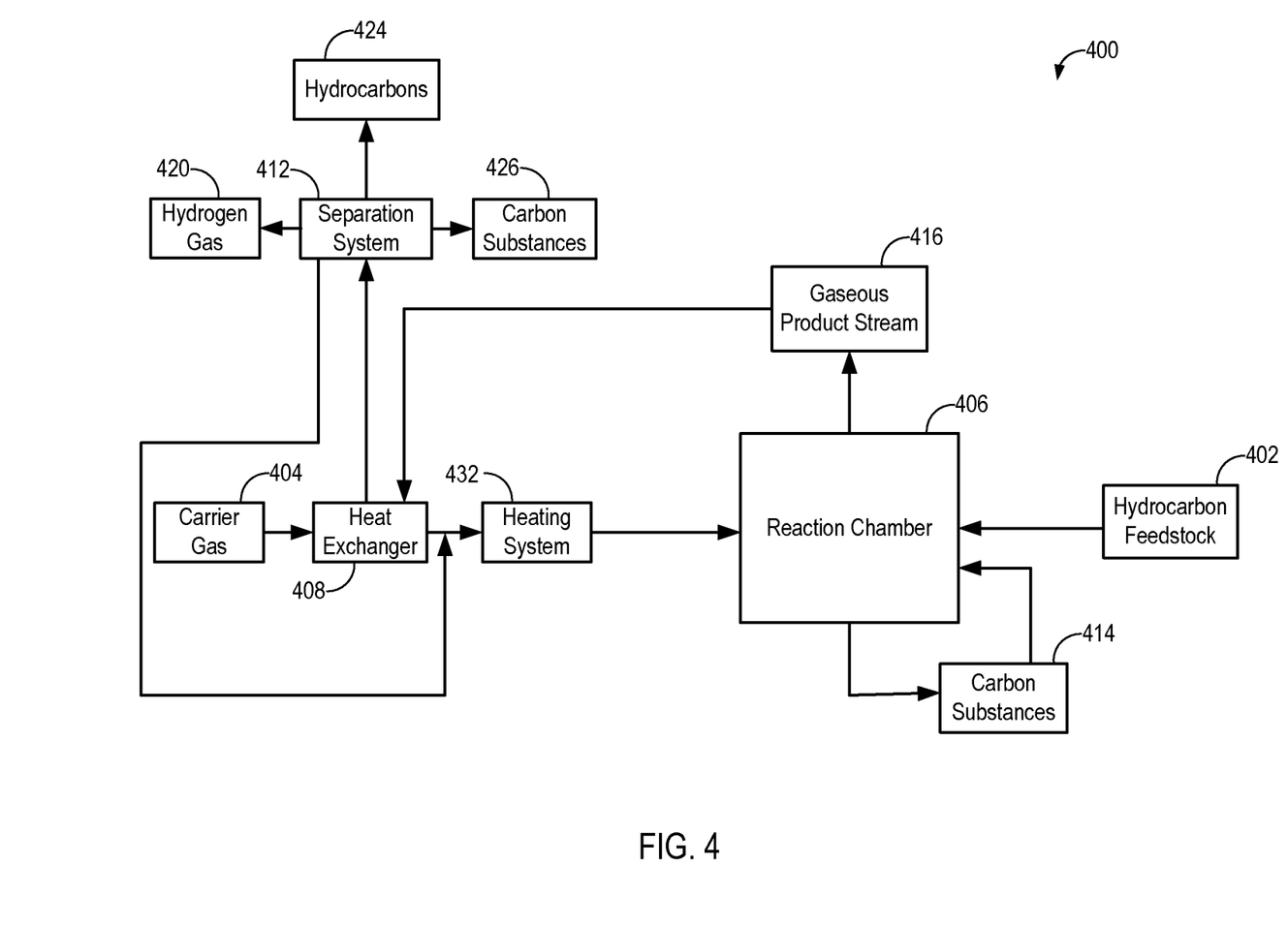
FIG. 4 is a schematic diagram of a system for producing hydrogen gas, according to another embodiment of the present disclosure.

FIG. 4 is a schematic diagram of a system 400, according to another embodiment of the present disclosure. As shown in FIG. 4, the system 400 may comprise a hydrocarbon feedstock 402, a supply of carrier gas 404, a heating system 432, and a reaction chamber 406. As set forth above with respect to FIG. 1, a first volume of carrier gas 404 and a second volume of hydrocarbon feedstock 402 may each independently be delivered to the reaction chamber 406. Prior to being delivered to the reaction chamber 406, the first volume of carrier gas 404 may be heated by the heating system 432.

The heating system 432 may comprise a heat source that is configured to heat the first volume of carrier gas 404. Any variety of heat sources previously discussed may be used by the heating system 432. For example, in an embodiment, the heating system 432 comprises a combustion heating system. In another embodiment, the heating system 432 comprises an electrical heating system. In another embodiment, the heating system 432 comprises a radiative heating system. In yet another embodiment, the heating system 432 comprises a plasma heating system. The heating system 432 may be catalytic or non-catalytic.

It is contemplated that in some embodiments heat or thermal energy generated from the heating system 432, or the heat source within the heating system 432, may be directly transferred to the first volume of carrier gas 404; in other embodiments, the heat or thermal energy generated from the heating system 432, or the heat source within the heating system 432, may be indirectly transferred to the first volume of carrier gas 404. Exemplary methods of indirectly transferring heat or thermal energy include the use of a heat exchanger.

As shown in FIG. 4, carbon substances 414 may be collected and removed from the system 400 as described above with respect to FIG. 1. As further shown in FIG. 4, a first gaseous product stream 416 may be collected from the reaction chamber 406. The first gaseous product stream 416 may thereafter be thermally coupled to a second volume of carrier gas 404. For example, as shown in FIG. 4, the first gaseous product stream 416 may be delivered to a heat exchanger 408. The heat exchanger 408 may be configured to remove heat from the first gaseous product stream 416 and transfer it to a second volume of carrier gas 404. As further shown in FIG. 4, the second volume of carrier gas 404 may be delivered to the heat exchanger 408 prior to being delivered into the reaction chamber 406. Further, the second volume of carrier gas 404 may exit or otherwise leave the heat exchanger 408 prior to being heated by the heating system 432 or any other heat source.

After being thermally coupled to the second volume of carrier gas 404, the first gaseous product stream 416 may be delivered to a separation system 412 that may be configured to remove or otherwise separate hydrocarbons 424, carbon substances 426, and/or hydrogen gas 420 from the first gaseous product stream 416. A portion of the first gaseous product stream 416 may thereafter be combined with the second volume of carrier gas 404 and delivered to the heating system 432 for reheating and reuse in subsequent decomposition reactions.

Figure 5:
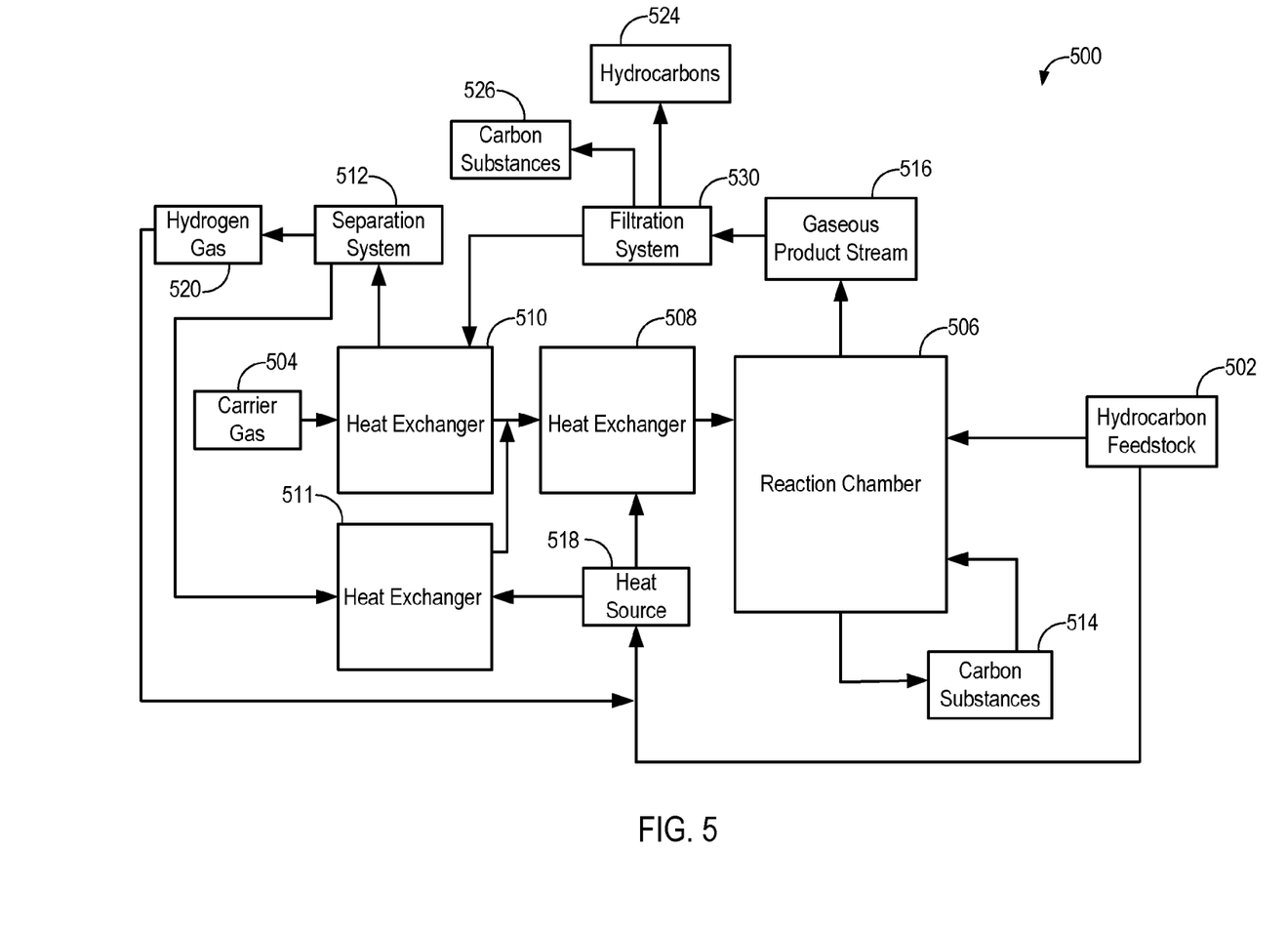
FIG. 5 is a schematic diagram of a system for producing hydrogen gas, according to another embodiment of the present disclosure.

FIG. 5 is a schematic diagram of a system 500, according to another embodiment of the present disclosure. As shown in FIG. 5, the system 500 may comprise a hydrocarbon feedstock 502, a supply of carrier gas 504, a first heat exchanger 508, and a reaction chamber 506. As set forth above with respect to FIG. 1, a first volume of carrier gas 504 and a first volume of hydrocarbon feedstock 502 may each independently be delivered to the reaction chamber 506. Prior to being delivered to the reaction chamber 506, the first volume of carrier gas 504 may pass through a first heat exchanger 508, and a second heat exchanger 510.

As shown in FIG. 5, carbon substances 514 may be collected and removed from the system 500 and used as described above with respect to FIG. 1. As further shown in FIG. 5, in some embodiments, a first gaseous product stream 516 may be collected and delivered to a filtration system 530 prior to being thermally coupled to the second volume of carrier gas 504. The filtration system 530 may be configured to filter or otherwise remove one or more components from the first gaseous product stream 516. For example, in the illustrated embodiment, the filtration system 530 may be configured to remove hydrocarbons 524 and carbon substances 526 from the first gaseous product stream 516.

A portion of the first gaseous product stream 516 may thereafter be thermally coupled to a second volume of carrier gas 504 by the second heat exchanger 510. After thermally coupling heat to the second volume of carrier gas 504 through the second heat exchanger 510, the portion of the first gaseous product stream 516 may be delivered to a separation system 512 that may be configured to remove at least a portion, or all, of the hydrogen gas 520 from the portion of the first gaseous product stream 516. By partially, or completely, removing the hydrogen gas 520 from the portion of the first gaseous product stream 516, the portion of the first gaseous product stream 516 may be converted into a second smaller portion of the first gaseous product stream 516, which may consist primarily of remnants of the first volume of carrier gas 504.

The second portion of the first gaseous product stream 516 may thereafter be delivered to a third heat exchanger 511 that may be configured to heat the second portion of the first gaseous product stream 516. The third heat exchanger may be configured such that it shares one or more common components with the first and/or second heat exchanger 508, 510. As further shown in the illustrated embodiment, a heat source 518 may be coupled to third heat exchanger 511. The heat source 518 may provide heat or otherwise transfer thermal energy to the third heat exchanger 511 prior to heating the second portion of the first gaseous product stream 516 with the third heat exchanger 511. The heat source 518 may be any of the above-mentioned heat sources, such as a combustion heating system that generates heat from the combustion of one or more combustible gases. Further, as shown in FIG. 5, in some embodiments, the heat source 518 may be coupled to both the first heat exchanger 508 and the third heat exchanger 511. In other embodiments, separate and independent heat sources 518 may be used to transfer thermal energy to each heat exchanger (e.g., the first heat exchanger 508 and the third heat exchanger 511).

The second portion of the gaseous product stream 516 may thereafter be delivered to the reaction chamber 506 for use in subsequent decomposition reactions, or may be added to or otherwise combined with a second volume of carrier gas 504 that is to be used in subsequent decomposition reactions. For example, in the illustrated embodiment, the second portion of the gaseous product stream 516 is added to or otherwise combined with the second volume of carrier gas 504 prior to heating the second volume of carrier gas 504 with the first heat exchanger 508. Accordingly, the combined second portion of the first gaseous product stream 516 and the second volume of carrier gas 504 may be heated by the first heat exchanger 508 and thereafter delivered to the reaction chamber 506 for use in subsequent decomposition reactions.

Figure 6:
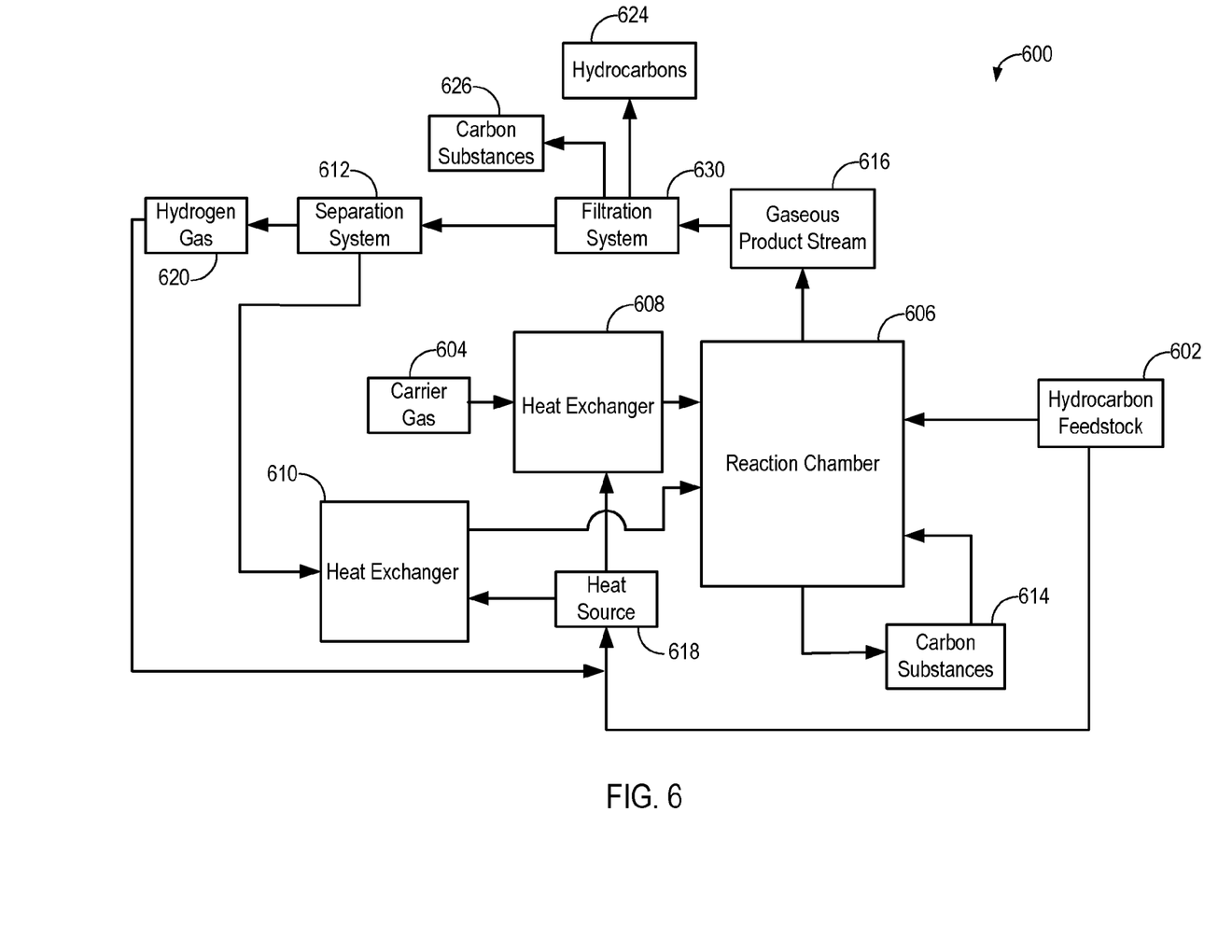
FIG. 6 is a schematic diagram of a system for producing hydrogen gas, according to another embodiment of the present disclosure.

FIG. 6 is a schematic diagram of a system 600, according to another embodiment of the present disclosure. As shown in FIG. 6, the system 600 may comprise a hydrocarbon feedstock 602, a supply of carrier gas 604, a first heat exchanger 608, and a reaction chamber 606. As set forth above with respect to FIG. 1, a first volume of carrier gas 604 and a first volume of hydrocarbon feedstock 602 may each independently be delivered to the reaction chamber 606. Prior to being delivered to the reaction chamber 606, the first volume of carrier gas 604 may be heated by the heat exchanger 608.

As shown in FIG. 6, carbon substances 614 may be collected and removed from the system 600 and used as described above with respect to FIG. 1. As further shown in FIG. 6, in some embodiments, a first gaseous product stream 616 may be collected from the reaction chamber 606 and delivered to a filtration system 630. The filtration system 630 may be configured to filter or otherwise remove one or more components from the first gaseous product stream 616. For example, in the illustrated embodiment, the filtration system 630 may be configured to remove hydrocarbons 624 and carbon substances 626 from the first gaseous product stream 616. In another embodiment, the filtration system 630 may be configured to remove carbon substances 626 from the first gaseous product stream 616, while leaving some or all of hydrocarbons 624 within the first gaseous product stream 616.

In some embodiments, a portion of the first gaseous product stream 616 may thereafter be delivered to a separation system 612. The separation system 612 may be configured to remove at least a portion, or all, of the hydrogen gas 620 from the portion of the first gaseous product stream 616. The portion of hydrogen gas 620 may be stored, sold, or used in the system 600. For example, a portion of the hydrogen gas 620 may be delivered to the heat source 618 and used in the generation of additional heat for the system 600. The hydrogen gas 620 may also be removed from the system 600 and used in other applications.

By partially, or completely, removing the hydrogen gas 620 from the portion of the first gaseous product stream 616, the portion of the first gaseous product stream 616 may be converted into a second smaller portion of the first gaseous product stream 616, which may consist primarily of remnants of the first volume of carrier gas 604 and optionally some or all of hydrocarbons 624. The second portion of the first gaseous product stream 616 may thereafter be delivered to a second heat exchanger 610 that may be configured to heat the second portion of the first gaseous product stream 616. The second heat exchanger may be configured such that it shares one or more common components with the first heat exchanger 608. The second portion of the gaseous product stream 616 may thereafter be delivered to the reaction chamber 606 for use in subsequent decomposition reactions. In other embodiments, the second portion of the first gaseous product stream 616 may be added to or otherwise combined with a second volume of carrier gas 604 prior to entry into the reaction chamber 606.

As further shown in the illustrated embodiment, a heat source 618 may be coupled to the second heat exchanger 610. The heat source 618 may provide heat or otherwise transfer thermal energy to the second heat exchanger 610 prior to heating the second portion of the first gaseous product stream 616 with the second heat exchanger 610. The heat source 618 may be any of the above-mentioned heat sources, such as a combustion heating system that generates heat from the combustion of one or more combustible gases. Further, as shown in FIG. 6, in some embodiments, the heat source 618 may be coupled to both the first heat exchanger 608 and the second heat exchanger 610. In other embodiments, separate and independent heat sources 618 may be used to transfer thermal energy to each heat exchanger (e.g., the first heat exchanger 608 and the second heat exchanger 610).

Provided herein also are systems and methods for preheating the hydrocarbon feedstock prior to delivering the hydrocarbon feedstock into the reaction chamber. For example, in some embodiments, at least a portion of the gaseous product stream may be delivered to a heat exchanger that is coupled to the hydrocarbon feedstock. The heat exchanger may be configured such that it removes heat from the gaseous product stream and transfers the heat to a volume of hydrocarbon feedstock that is being delivered to the reaction chamber for use in decomposition reactions. Notwithstanding, it is desirous that in these embodiments, only a limited amount of heat is transferred to the hydrocarbon feedstock such that transferring heat to the hydrocarbon feedstock does not cause the decomposition, or the substantial decomposition, of the hydrocarbon feedstock prior to delivering the hydrocarbon feedstock to the reaction chamber.

Also provided herein are systems and methods for preheating the one or more combustible gases that may be used in a combustion system to generate heat for the system or method. For example, in some embodiments, at least a portion of the gaseous product stream may be delivered to a heat exchanger that is coupled to a combustible gas. The heat exchanger may be configured to transfer heat from the portion of the gaseous product stream to the combustible gas. The combustible gas may thereafter be delivered to a second heat exchanger. A second combustible gas may also be delivered to the second heat exchanger, and the first and second combustible gases may combust with one another. The combustion of the first combustible gas and the second combustible gas may serve as a heat source for the second heat exchanger. The second heat exchanger may thereafter be used to heat the carrier gas prior to delivering the carrier gas to the reaction chamber. It is contemplated that the first and second combustible gases may comprise air, oxygen, hydrocarbon feedstock, or hydrogen gas, or mixtures thereof. It is further contemplated that the hydrogen gas may be derived from the first gaseous product stream and may be at a temperature that is greater than ambient temperature.

Further provided herein are systems and methods for disrupting the buildup of carbon substances on one or more selected surfaces. As previously mentioned, in some embodiments carbon substances may be deposited on various surfaces within the reaction chamber. This is a common problem associated with thermally decomposing hydrocarbons and often the cause of expensive and costly system shutdowns for the purpose of cleaning or otherwise removing the buildup of carbon substances. In certain embodiments disclosed herein, ultrasonic agitation may be used to disrupt the buildup of carbon substances on one or more selected surfaces.

In some embodiments, the source of the ultrasonic agitation may be a generator. The generator may be, for example, a mechanical generator, an electrical generator, a piezoelectric generator, or a magnetostrictive generator. It is contemplated that one or more parameters of the ultrasonic wave may be varied as needed or desired. Such parameters include the frequency, amplitude, duration and site of the ultrasonic agitation. For example, in some embodiments, the variable parameter may be a frequency of the ultrasonic agitation. Typical ultrasonic wave frequencies may be in the range of about 1 to about 800 kHz. In other embodiments, the variable parameter may be an amplitude of the ultrasonic agitation. In other embodiments, the variable parameter may be a duration of the ultrasonic agitation. In other embodiments, the variable parameter may be a site of the ultrasonic agitation.

In some embodiments, one or more parameters of the ultrasonic agitation may be varied based on the amount of carbon substances that are deposited on a selected surface. This may be influenced by reaction conditions such as temperature and rate of decomposition, etc. One or more parameters of the ultrasonic agitation may also be varied based on reaction conditions and the time the ultrasonic agitation is being applied. One or more parameters of the ultrasonic agitation may also be varied based on the deposition rate of the carbon substances on a selected surface, or based on the type of carbon substances deposited on a selected surface.

The ultrasonic wave generator may be coupled to the reaction chamber. The ultrasonic wave generator may be disposed substantially perpendicularly to the exterior of the reaction chamber. However, the ultrasonic wave generator may also be disposed in any other suitable orientation. The ultrasonic wave generator may further be protected by one or more fluids. The ultrasonic waves may therefore be transmitted through the one or more fluids as necessary.

It is further contemplated that ultrasonic agitation may be applied to a variety of selected surfaces. In some embodiments, the selected surfaces may be surfaces that are within the reaction chamber. For example, the reaction chamber may comprise one or more walls. Each wall may comprise an inner surface and an outer surface. The inner surface is directed toward the inside of the reaction chamber. In some embodiments, at least one selected surface to which ultrasonic agitation may be applied may be a wall or an inner surface of the reaction chamber. The reaction chamber may further comprise one or more windows. Each window may have an inner surface that is directed toward the inside of the reaction chamber. In some embodiments, at least one of the selected surfaces to which ultrasonic agitation may be applied may be the inner surface of a window.

The reaction chamber may further comprise additional components such as one or more inlet ports, one or more outlet ports, discrete injectors, nozzles, etc. that are coupled or otherwise attached thereto. The one or more inlet ports may be configured to allow the introduction of carrier gas and/or hydrocarbon feedstock into the reaction chamber; the one or more outlet ports may be configured to allow the gaseous product stream and/or carbon substances out of the reaction chamber; and the discrete injectors and nozzles may be configured to deliver the carrier gas into the reaction chamber. As can be appreciated, each of these components may comprise one or more surfaces that are directed toward the inside of the reaction chamber. It is contemplated that each of their surfaces directed toward the inside of the reaction chamber may be a selected surface to which ultrasonic agitation may be applied.

In some embodiments, at least one selected surface to which ultrasonic agitation may be applied may be an electrode; in some embodiments, at least one selected surface to which ultrasonic agitation may be applied may be the surface of a heat exchanger; and in some embodiments, at least one selected surface to which ultrasonic agitation may be applied may be a catalyst surface. It is therefore contemplated that virtually any surface that may be used in accordance with the thermal decomposition reaction may be a selected surface to which ultrasonic agitation may be applied.

Methods for producing hydrogen gas from the thermal decomposition of hydrocarbons are also provided herein. In particular, it is contemplated that any of the components, principles, and/or embodiments discussed above may be utilized by either a system of a method. For example, in an embodiment, a method for thermally decomposing hydrocarbon feedstock may comprise a step of heating a first volume of non-oxidizing carrier gas with a first heat exchanger. The method may further comprise a step of delivering a first volume of hydrocarbon feedstock into a reaction chamber. Still further, the method may comprise a step of delivering the first volume of carrier gas into the reaction chamber such that the first volume of carrier gas and the first volume of hydrocarbon feedstock mix within the reaction chamber and the first volume of carrier gas transfers heat to the first volume of hydrocarbon feedstock within the reaction chamber causing the decomposition of the first volume of hydrocarbon feedstock, and wherein the decomposition of the first volume of hydrocarbon feedstock results in a product comprising hydrogen gas and carbon substances. The method may comprise a step of collecting a first gaseous product stream from the reaction chamber, wherein the first gaseous product stream comprises hydrogen gas and carrier gas. The method may yet further comprise a step of thermally coupling heat from at least a portion of the first gaseous product stream into a second volume of carrier gas before delivering the second volume of carrier gas into the reaction chamber.

In another embodiment, a method for thermally decomposing hydrocarbon feedstock may comprise a step of heating a first volume of non-oxidizing carrier gas with a first heat exchanger. The method may further comprise a step of delivering a first volume of hydrocarbon feedstock into a reaction chamber. The method may further comprise a step of delivering the first volume of carrier gas into the reaction chamber such that the first volume of carrier gas and the first volume of hydrocarbon feedstock mix within the reaction chamber and the first volume of carrier gas transfers heat to the first volume of hydrocarbon feedstock within the reaction chamber causing the decomposition of the first volume of hydrocarbon feedstock, and wherein the decomposition of the first volume of hydrocarbon feedstock results in a product comprising hydrogen gas and carbon substances. The method may further comprise the step of collecting a first gaseous product stream, wherein the first gaseous product stream comprises hydrogen gas and carrier gas. The method may further comprise the step of delivering at least a portion of the first gaseous product stream to a second heat exchanger. Still further, the method may comprise a step of heating the portion of the first gaseous product stream using the second heat exchanger. The method may still further comprise a step of delivering a second volume of hydrocarbon feedstock into the reaction chamber. Still further, the method may comprise a step of delivering the portion of the first gaseous product stream into the reaction chamber such that the portion of the first gaseous product stream and the second volume of hydrocarbon feedstock mix within the reaction chamber and the portion of the first gaseous product stream transfers heat to the second volume of hydrocarbon feedstock within the reaction chamber causing the decomposition of the second volume of hydrocarbon feedstock, and wherein the decomposition of the second volume of hydrocarbon feedstock results in a product comprising hydrogen gas and carbon substances. The method may further comprise a step of collecting a second gaseous product stream, wherein the second gaseous product stream comprises hydrogen gas and carrier gas. In some embodiments, the method may further comprise a step of repeating the steps of delivering the portion of the first gaseous product stream to the second heat exchanger, heating the portion of the first gaseous product stream using the second heat exchanger, delivering a second volume of hydrocarbon feedstock into the reaction chamber, delivering the portion of the first gaseous product stream into the reaction chamber, and collecting a second gaseous product stream.

In another embodiment, a method for thermally decomposing hydrocarbon feedstock may comprise a step of heating a non-oxidative carrier gas. The method may further comprise a step of delivering a first volume of hydrocarbon feedstock into a reaction chamber. The method may further comprise a step of delivering the carrier gas into the reaction chamber using a high speed injection method such that the carrier gas and the first volume of hydrocarbon feedstock mix within the reaction chamber and the carrier gas transfers heat to the first volume of hydrocarbon feedstock within the reaction chamber causing the decomposition of the first volume of hydrocarbon feedstock, and wherein the decomposition of the first volume of hydrocarbon feedstock results in a product comprising hydrogen gas and carbon substances.

In another embodiment, a method for thermally decomposing hydrocarbon feedstock may comprise a step of delivering a volume of hydrocarbon feedstock into a reaction chamber. The method may further comprise a step of heating the volume of hydrocarbon feedstock in a non-oxidative manner within the reaction chamber, wherein heating the volume of hydrocarbon feedstock causes the decomposition of the volume of hydrocarbon feedstock, and wherein the decomposition of the volume of hydrocarbon feedstock results in a product comprising hydrogen gas and carbon substances. The method may further comprise a step of applying ultrasonic agitation to the reaction chamber to disrupt a buildup of carbon substances on one or more selected surfaces.

In another embodiment, a method for thermally decomposing hydrocarbon feedstock may comprise a step of heating a volume of non-oxidizing carrier gas with a first heat exchanger. The method may further comprise a step of delivering a volume of hydrocarbon feedstock into a reaction chamber. Still further, the method may comprise a step of delivering the volume of carrier gas into the reaction chamber such that the volume of carrier gas and the volume of hydrocarbon feedstock mix within the reaction chamber and the volume of carrier gas transfers heat to the volume of hydrocarbon feedstock within the reaction chamber causing the decomposition of the volume of hydrocarbon feedstock, and wherein the decomposition of the volume of hydrocarbon feedstock results in a product comprising hydrogen gas and carbon substances. The method may yet further comprise a step of collecting a first gaseous product stream, wherein the first gaseous product stream comprises hydrogen gas and carrier gas. The method may further comprise a step of applying ultrasonic agitation to the reaction chamber to disrupt a buildup of carbon substances on one or more selected surfaces.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims.

What is claimed is:

1. A method for thermally decomposing hydrocarbon feedstock, comprising:

heating a first volume of non-oxidizing, inert carrier gas with a first heat exchanger such that the first volume of non-oxidizing, inert carrier gas if mixed with a volume of hydrocarbon feedstock would cause at least partial decomposition of the volume of hydrocarbon feedstock, wherein the first heat exchanger comprises at least one of a regenerative heat exchanger, a regenerator, a countercurrent heat exchanger, a recuperator, or combinations thereof;

delivering a first volume of hydrocarbon feedstock into a reaction chamber;

delivering the first volume of non-oxidizing, inert carrier gas into the reaction chamber such that the first volume of non-oxidizing, inert carrier gas and the first volume of hydrocarbon feedstock mix within the reaction chamber and the first volume of non-oxidizing, inert carrier gas transfers heat to the first volume of hydrocarbon feedstock within the reaction chamber causing the decomposition of the first volume of hydrocarbon feedstock, and wherein the decomposition of the first volume of hydrocarbon feedstock results in a product comprising hydrogen gas and carbon substances;

collecting a first gaseous product stream, wherein the first gaseous product stream comprises hydrogen gas and at least a portion of the first volume of non-oxidizing, inert carrier gas;

thermally coupling heat from at least a portion of the first gaseous product stream into a second volume of non-oxidizing, inert carrier gas with a second heat exchanger wherein after thermally coupling heat from the at least a portion of the first gaseous product stream into the second volume of carrier gas through use of the second heat exchanger, the at least a portion of the first gaseous product stream is converted into a second portion of the first gaseous product stream by at least partial removal of hydrogen gas from the portion of the first gaseous product stream; and delivering the second volume of non-oxidizing, inert carrier gas into the reaction chamber.

2. The method of claim 1, further comprising:

heating the second portion of the first gaseous product stream with a third heat exchanger.

3. The method of claim 2, wherein the first heat exchanger and the third heat exchanger share one or more components.

4. The method of claim 2, further comprising:

transferring thermal energy from a heat source to the third heat exchanger prior to heating the second portion of the first gaseous product stream with the third heat exchanger.

5. The method of claim 2, further comprising:

delivering a second volume of hydrocarbon feedstock into the reaction chamber;

delivering the heated second portion of the first gaseous product stream into the reaction chamber such that the heated second portion of the first gaseous product stream and the second volume of hydrocarbon feedstock mix within the reaction chamber and the heated second portion of the first gaseous product stream transfers heat to the second volume of hydrocarbon feedstock within the reaction chamber causing the decomposition of the second volume of hydrocarbon feedstock, and wherein the decomposition of the second volume of hydrocarbon feedstock results in a product comprising hydrogen and carbon substances; and collecting a second gaseous product stream, wherein the second gaseous product stream comprises hydrogen gas and carrier gas.

6. The method of claim 1, further comprising:

adding at least part of the second portion of the first gaseous product stream to the second volume of carrier gas before delivering the second volume of carrier gas into the reaction chamber.

7. The method of claim 1, wherein before thermally coupling heat from the portion of the first gaseous product stream into the second volume of carrier gas, at least a portion of hydrogen gas is removed from the portion of the first gaseous product stream.

8. The method of claim 7, further comprising:

after thermally coupling heat from the portion of the first gaseous product stream into the second volume of carrier gas, adding at least part of the portion of the first gaseous product stream to the second volume of carrier gas before delivering the second volume of carrier gas into the reaction chamber.

9. The method of claim 1, wherein the hydrocarbon feedstock comprises a compound with the formula $C_nH_m$, wherein n is 1, 2, 3 or 4, and m is independently selected from 2, 4, 6, 8 or 10.

10. The method of claim 9, wherein the hydrocarbon feedstock comprises one or more of the following: $CH_4$, $C_2H^4$, $C_2H_6$, $C_3H_8$, and $C_4H_{10}$.

11. The method of claim 1, wherein the hydrocarbon feedstock comprises natural gas.

12. The method of claim 1, wherein the second heat exchanger and the first heat exchanger are configured such that they share common components.

13. The method of claim 1, wherein the non-oxidizing, inert carrier gas comprises a gas that does not readily undergo chemical reactions when being subjected to heat.

14. The method of claim 1, wherein the non-oxidizing, inert carrier gas comprises a noble gas.

15. The method of claim 1, wherein the non-oxidizing, inert carrier gas comprises argon.

16. The method of claim 1, wherein the non-oxidizing, inert carrier gas comprises helium.

17. The method of claim 1, wherein the non-oxidizing, inert carrier gas comprises hydrogen.

18. The method of claim 1, wherein the non-oxidizing, inert carrier gas comprises nitrogen.

* * * * *